United States Patent
Peotter

[19]

[11] Patent Number: 6,109,310
[45] Date of Patent: Aug. 29, 2000

[54] FUEL TANK VENT SYSTEM WITH ORIFICE

[75] Inventor: Benjamin G. Peotter, Kaukauna, Wis.

[73] Assignee: Illinois Tool Works, Inc., Glenview, Ill.

[21] Appl. No.: 09/222,527

[22] Filed: Dec. 29, 1998

[51] Int. Cl.$^7$ .................................................. B65D 90/34
[52] U.S. Cl. ............................... 141/7; 141/59; 220/86.2; 220/562; 220/745
[58] Field of Search .................................. 141/4, 5, 7, 59; 123/516; 137/587; 220/86.2, 746, 4.14, 86.1, 562, 581, 745, 749

[56] References Cited

U.S. PATENT DOCUMENTS

| | | | |
|---|---|---|---|
| 1,217,732 | 2/1917 | Fedders | 165/148 |
| 1,584,671 | 5/1926 | Sleppy | 165/111 |
| 3,394,842 | 7/1968 | Randolph et al. | 220/86.1 |
| 3,396,875 | 8/1968 | Finch | 222/456 |
| 5,000,335 | 3/1991 | Osborne | 220/745 |
| 5,392,804 | 2/1995 | Kondo et al. | 137/202 |
| 5,551,405 | 9/1996 | Thompson | 123/516 |
| 5,928,535 | 7/1999 | Trinkner et al. | 219/133 |
| 6,029,635 | 2/2000 | Sekine et al. | 123/516 |

Primary Examiner—Henry J. Recla
Assistant Examiner—Peter deVore
Attorney, Agent, or Firm—Mark W. Croll; Donald Cayen

[57] ABSTRACT

A fuel tank has a void air space when the tank is filled through a filler tube that upstands from a reservoir. The reservoir has a baffle that depends from a top wall of the reservoir. Fuel entering the reservoir from the filler tube fills the reservoir up to the level of the lowermost edge of the baffle. Further filling of the tank causes the fuel level to rise in the filler tube. However, a void space is created because air and fuel vapor are trapped in the reservoir on the opposite side of the baffle as the filler tube, which prevents overfilling by an operator. A vent system connects the void space with the top end of the filler tube. Hydrostatic pressure exerted by the fuel on the air and fuel vapor in the void space expels the air and fuel vapor through the vent system to the filler tube, causing the fuel level to rise in the void space and simultaneously to lower in the filler tube. Eventually all the air and fuel vapor are expelled, and the fuel level in the filler tube is then at a minimum level. The invention is capable of venting a fuel tank that is tilted in operation such that a void space is present in the reservoir.

10 Claims, 3 Drawing Sheets

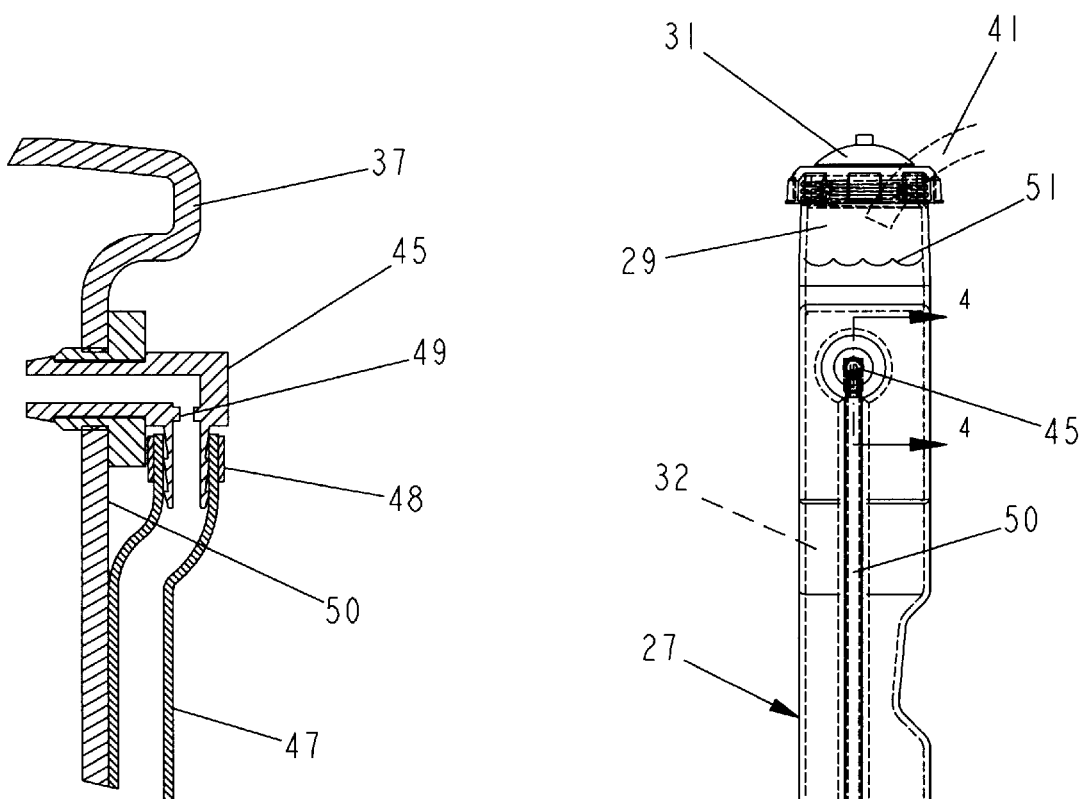
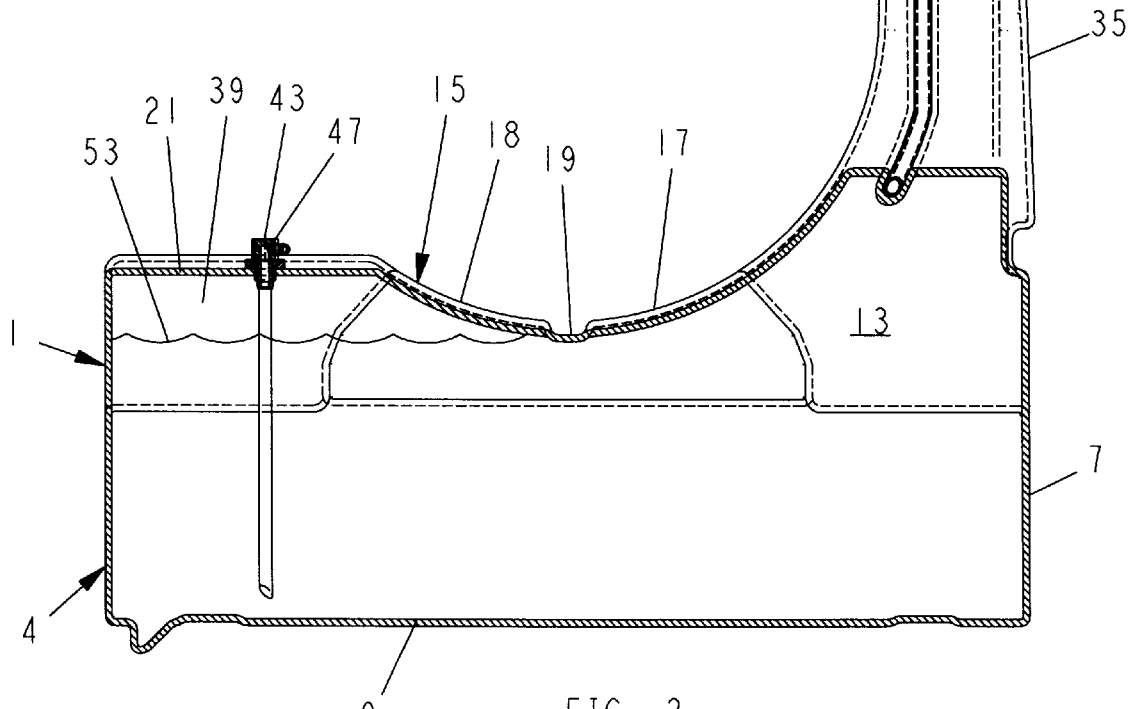
FIG. 4
FIG. 2

FUEL TANK VENT SYSTEM WITH ORIFICE

Background of the Invention

1. Field of the Invention

This invention pertains to fuel systems for internal combustion engines, and more particularly to apparatus that stores fuel for engine-driven welding machines.

2. Description of the Prior Art

Engine-driven welding machines invariably include a large tank that holds fuel for the machine internal combustion engine. The fuel tank is often flat and is preferably located in a base in the lowermost part of the machine. To make the fuel tank easy to fill, it normally includes a long filler tube that upstands from the tank top wall. The upper end of the filler tube is provided with a removable cap.

The operator of an engine-driven welding machine encounters two related problems in conjunction with supplying fuel to the machine. First, the welding machines are often transported on trucks, and the machine fuel tanks are commonly filled at truck stops. The operator usually wants to fill the fuel tank as full as possible. It is highly important that the air in the tank be vented to the atmosphere as the tank is being filled. During filling, the fuel displaces air in the tank up the filler tube. For optimum venting, the tank should not be completely full. However, the operator often fills the tank until he sees fuel in the filler tube. At that point, there is little, if any, void space in the tank. During welding machine operation when fuel is being consumed, its level falls within the tank. Ideally, the volume of fuel consumed is replaced with air from the atmosphere that descends through the filler tube.

The related problem is caused by the expansion of the fuel and any unvented fuel vapor in the welding machine tank. Fuel that comes from underground storage tanks is usually cooler than fuel at ambient temperature. The fuel and any trapped vapor in the tank therefore expands as the truck is driven to the job site. Even if the operator leaves some space in the tank filler tube at fueling, the trapped vapor expands and forces fuel up the filler tube.

It is possible that the welding machine is tilted at an angle relative to gravity during operation, such as if the truck is parked on a slight incline at the job site, with the filler tube being on the low side of the tank. The combination of the angle of tilt and the amount of fuel in the tank can result in the intersection of the tank top wall and the filler tube being below the fuel level, and a void space being created at the high side of the tank. Fuel vapors in the void space can heat and expand during welding machine operation. The vapor pressure in the void space can force fuel up and out the filler tube, which is highly undesirable.

Whether by manually topping off the tank or through thermal expansion, fuel in the filler tube of an improperly vented fuel tank is likely to slosh up the filler tube. Accordingly, fuel is spilled and runs down the welding machine as well as the truck.

SUMMARY OF THE INVENTION

In accordance with the present invention, a fuel tank vent system is provided that solves the problems associated with filled fuel tanks. This is accomplished by connecting a void space normally containing trapped vapor in the tank with the top of the tank filler tube.

According to one aspect of the invention, the fuel tank is flat and has opposite side walls and a top wall. A filler tube upstands from the top wall close to one side wall. The connection is comprised of a first fitting installed in the tank top wall close to the second side wall, and a second fitting installed in the filler tube near the top end thereof. A tube runs alongside the filler tube and the tank top wall between the two fittings. The second fitting has a small orifice in it. If the welding machine is at an angle during operation such that a void space is created adjacent the tank second side wall, the vapors in the void space vent to the filler tube.

According to another aspect of the invention, the fuel tank has a top wall with a baffle joined to it. The baffle extends toward the tank bottom wall and terminates in a lowermost edge. The fuel tank filler tube is located on the opposite side of the top wall baffle as a first side wall of the tank. The void space in the tank is bounded by the tank end walls, the first side wall, the baffle, and the top wall between the first side wall and the baffle.

The connection between the tank void space and the filler tube is comprised of a first fitting installed in the tank top wall over the void space, and a second fitting installed in the filler tube near the top end thereof. A tube runs alongside the filler tube and the tank top wall between the two fittings. The second fitting has a small orifice in it.

When fuel is pumped into the filler tube, it rises into the tank until it reaches the lowermost edge of the baffle. Continued filling results in the fuel rising in most of the fuel tank. However, air becomes trapped in the void space, and no fuel enters that space. The operator can fill the tank until the fuel is at the top of the filler tube. Although the top of the filler tube is connected via the two fittings and the tube to the tank void space, the orifice in the second fitting restricts the flow of fuel and vapor from entering the void space in the tank by restricting the air and vapor from venting that space. Consequently, the operator assumes the tank is full when the fuel is at the top of the filler tube. He therefore removes the fuel nozzle and replaces the filler tube cap.

The fuel in the filler tube exerts a hydrostatic pressure on the air and vapor trapped in the void space. The fuel hydrostatic pressure slowly forces the air and vapor to bleed out the first fitting and through the tube to the second fitting. From the second fitting, the air and vapor are transferred to the filler tube. Simultaneously, the void space formerly occupied by the expelled air and vapor becomes occupied by fuel rising into the void space. Accordingly, the fuel level falls in the filler tube. Ultimately, all the trapped air and vapor are expelled. At that point, the fuel level in the filler tube has lowered to a level such that the fuel does not slosh out of the filler tube due either to movement of the tank or to thermal expansion of the fuel.

Other advantages, benefits, and features of the present invention will become apparent to those skilled in the art upon reading the detailed description of the invention. Such advantages include the venting of a flat fuel tank during tilted-angle operation.

BRIEF DESCRIPTION OF THE DRAWINGS

FIG. 2 is a cross sectional view on an enlarged scale taken along line 2—2 of FIG. 1, showing the fuel tank initially filled with fuel to the top of the filler tube.

FIG. 4 is a cross sectional view on an enlarged scale taken along line 4—4 of FIG. 2.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
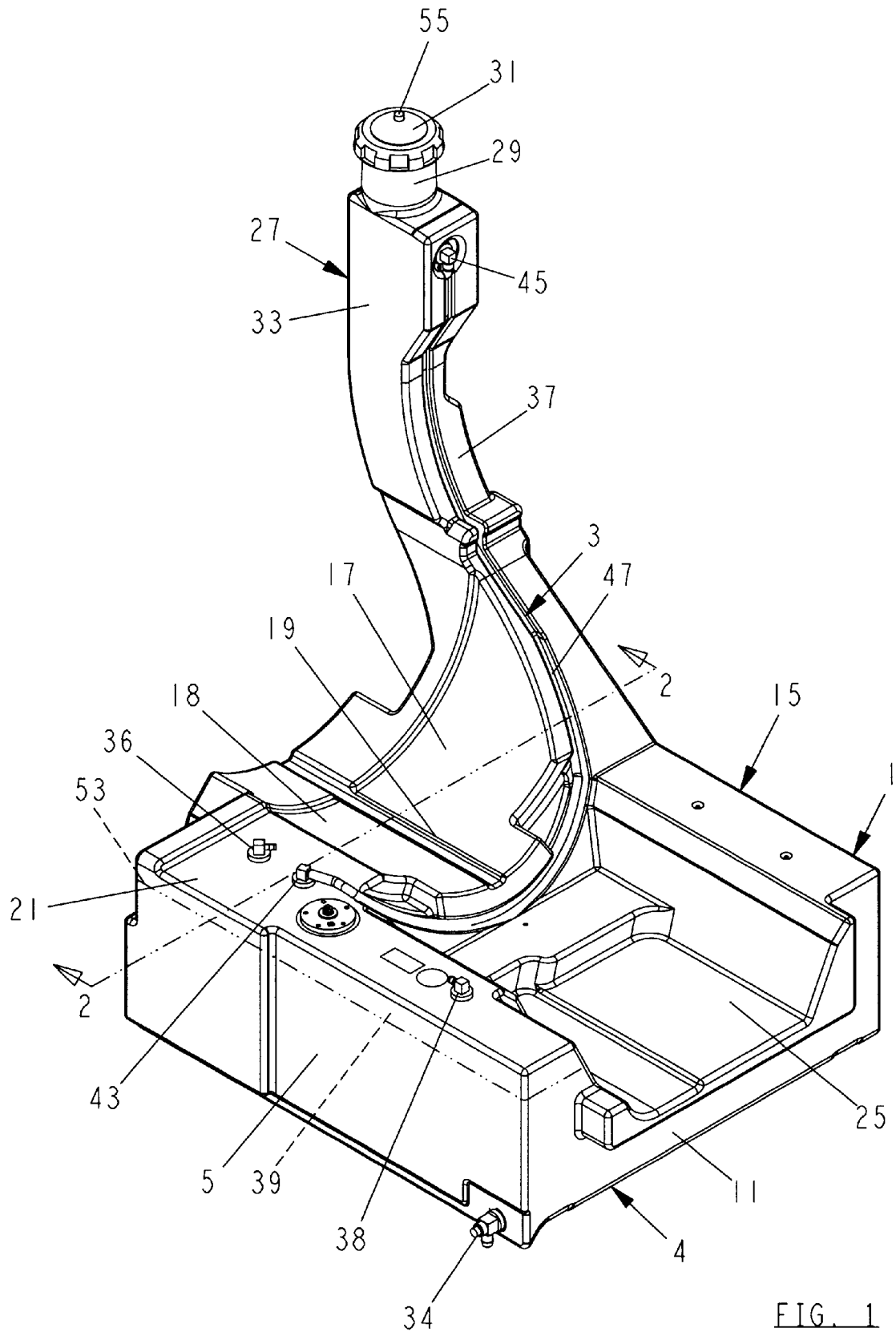
FIG. 1 is a perspective view of a fuel tank that includes the present invention.

Referring to FIGS. 1 and 2, a fuel tank 1 with a vent system 3 is illustrated that includes the present invention. The particular fuel tank 1 shown is used to store fuel for an engine-driven welding machine, not shown but well known in the art. However, it will be understood that the invention is not limited to welding machine applications.

To suit its application to an engine-driven welding machine, the fuel tank 1 is designed to fit in the welding machine base under most of the other machine components. The fuel tank has a reservoir 4 with a first side wall 5, a second side wall 7, a bottom wall 9, a first end wall 11, and a second end wall 13. A top wall 15 is irregularly shaped. In the particular construction shown, the top wall 15 has a concave section 17 that clears the welding machine generator. There is a horizontal edge portion 21 of the top wall joined to the concave section 17 adjacent the first side wall 5.

The part of the top wall concave section 17 that is joined to the top wall edge portion 21 serves as a baffle 18. The baffle 18 has a lowermost edge 19 that, in the fuel tank 1 shown, coincides with a bottom line of the concave section. Thus, the concave section bottom line 19 is also the lowermost edge 19 of the baffle 18. The top wall of the particular reservoir 4 shown also has a flat region 25 that is at or slightly below the level of the concave section bottom line 19.

Integral with the fuel tank reservoir 4 is a filler tube 27. The filler tube 27 is located on the opposite side of the baffle 18 as the reservoir first wall 5. The top end 29 of the filler tube 27 is substantially above the reservoir and is at a location that is easily accessible to a person filling the fuel tank 1. The filler tube top end 29 is threaded to receive a cap 31. In the illustrated construction, one wall 33 of the filler tube is a continuation of the concave surface 17 of the reservoir top wall 15. The filler tube wall 35 opposite the wall 33 is a continuation of the reservoir wall 7. The filler tube end wall 32 is a continuation of the reservoir wall 13. A fourth wall 37 completes the filler tube. Fittings 36 and 38 in the reservoir top wall portion 21 are used with suitable hoses that lead to and from the engine fuel pump. Fitting 34 in the reservoir side wall 5 is a drain.

The vent system 3 is comprised of a first fitting 43 that is installed in the edge portion 21 of the reservoir top wall 15, and a second fitting 45 installed in the wall 37 of the filler tube 27. A tube 47 connects the fittings 43 and 45. Hose clamps 48 may be used to retain the tube 47 on the fittings 43 and 45. Also see FIG. 4. The tube 47 runs along the outside of the filler tube wall 37 and along a ledge adjacent the reservoir concave surface 17. Preferably, there is a groove 50 in the filler tube wall 37 in which the tube 47 fits. The fitting 45 has an orifice 49 in it. The orifice size will depend on the particular application, including reservoir and tank size, fill rate, and filler tube height and cross-sectional area. A representative size that works very well for a particular set of conditions is approximately 0.038 inches.

It is a feature of the present invention that a void air space 39 is created inside the reservoir 4 when the fuel tank 1 is filled. In FIG. 2, a filler hose nozzle is schematically shown at reference numeral 41. Fuel pouring down the filler tube 27 enters the reservoir 4 and eventually reaches the level of the lowermost edge 19 of the baffle 18. Continued filling of the fuel tank results in fuel rising in the filler tube up to a maximum level 51 at the filler tube top end 29. However, the fuel cannot rise above a level 53 in the reservoir under the top wall edge portion 21, because air is trapped in the space 39 by the rising fuel. As shown in FIG. 1, the void air space 39 extends into all spaces in the reservoir under the top wall 15 higher than and on the opposite side of the baffle 18 as the filler tube.

It will be noted that the fitting 43 connects the void space 39 with the filler tube 27. However, the orifice 49 in the fitting 45 allows only minimal venting of fuel vapor from the void space 39. The fuel delivery system represented by the nozzle 41 is capable of a much higher flow rate than the fitting 45 can vent. Consequently, the fuel rises to the level 51 at filling as though the vent system 3 was not present. At that point, whether by automatic or manual nozzle shut off, the operator assumes the fuel tank 1 is full. He therefore stops fuel delivery, removes the nozzle 41, and replaces the cap 31.

As soon as the fuel level in the filler tube 27 rises above the level of the lowermost edge 19 of the baffle 18, the fuel hydrostatic pressure increases the air and vapor pressure in the void space 39. As a result, the air and vapor in the void space are expelled out the fittings 43 and 45 and the tube 47 to the top end 29 of the filler tube and/or to the atmosphere through an external vent 55 in the cap 31. Because of the small size of the orifice 49, however, the flow of the expelled air and vapor is slow. That situation also contributes to the filling of the fuel tank 1 as though the vent system 3 was not present.

Figure 3:
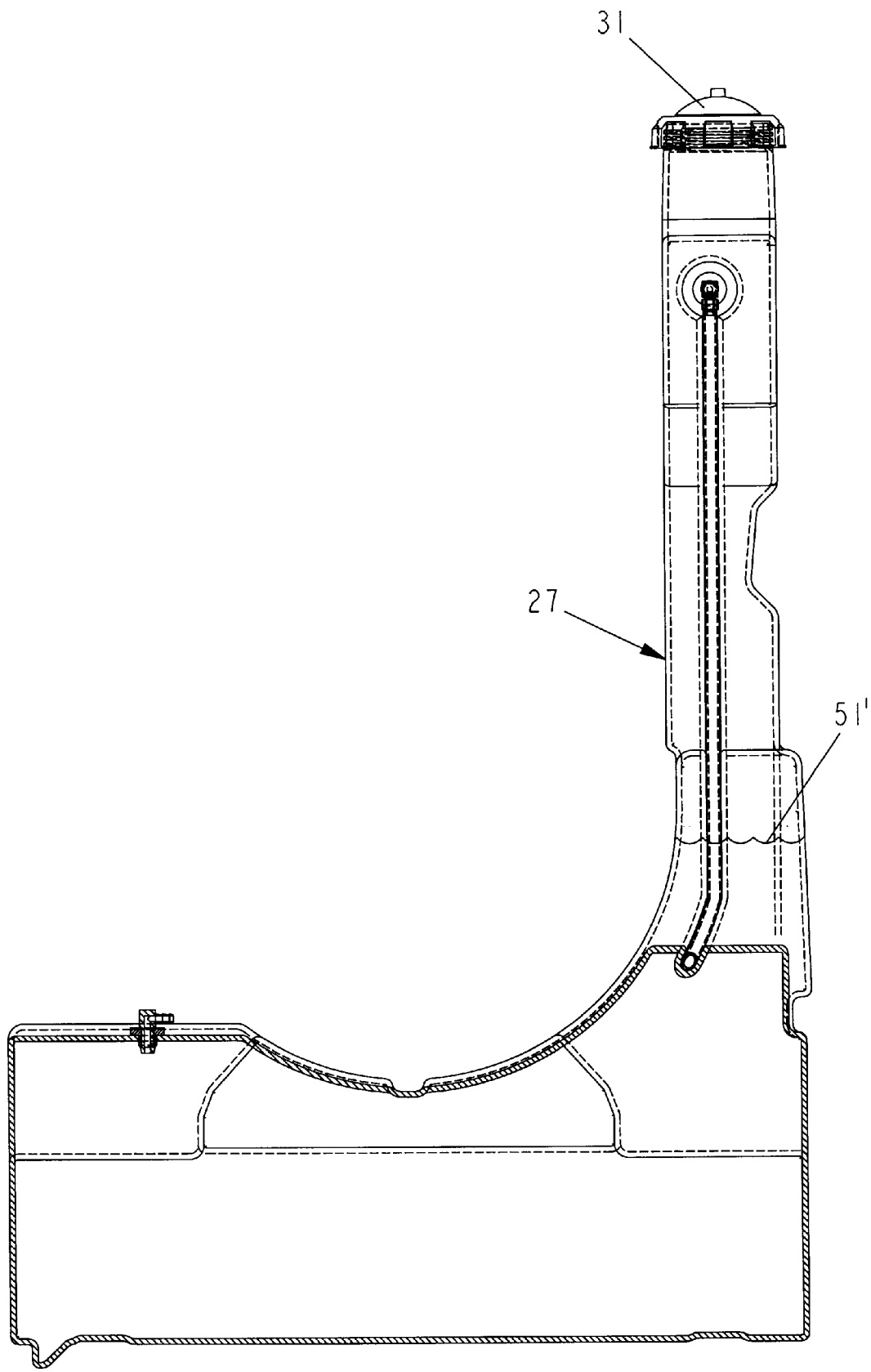
FIG. 3 is a view similar to FIG. 2, but showing the fuel level after air has been expelled from the tank void space.

Despite the slow rate at which air and vapor bleeds from the void space 39 through the vent system 3 to the top end 29 of the filler tube 27, the air and vapor are nevertheless constantly being expelled by the hydrostatic pressure of the fuel. The fuel tank 1 need not be on a level surface for the vent system 3 to operate. As the air and vapor are expelled, the fuel level 53 rises in the void space, and the fuel level 51 falls an amount proportional to the volume of the displaced air and vapor. Eventually, all the air and vapor are expelled such that the void space is displaced by fuel, FIG. 3. At that time, the fuel level in the filler tube has fallen to a lower level 51'. The result is that the fuel in the filler tube is much less likely to slosh out of the cap 31 when the engine-driven welding machine with the fuel tank vent system 3 is transported by a vehicle. Similarly, there is plenty of room in the filler tube for expansion of fuel and vapors as they warm up from the temperature of an underground storage tank. The vent system also enables venting of the fuel vapors from the void space that is created as fuel is consumed during welding machine operation.

Thus, it is apparent that there has been provided, in accordance with the invention, a fuel tank vent system with orifice that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A fuel tank with a vent system comprising:

a. a reservoir with a filler tube upstanding therefrom comprising a top wall with a baffle depending therefrom having a lowermost edge, the reservoir defining a void space when fuel is filled in the fuel tank to prevent overfilling of the fuel tank, the void space being on the opposite side of the baffle as the filler tube, and the reservoir top wall comprising a portion that is above the void space; and b. vent means for slowly bleeding fuel vapor from the void space to the filler tube in response to warming of the fuel vapor in the reservoir void space, the vent means comprising:

i. a first fitting in the reservoir top wall above the void space;

ii. a second fitting in the filler tube; and iii. a tube having a first end connected to the first fitting and a second end connected to the second fitting.

2. The fuel tank of claim 1 further comprising an orifice within a selected one of the first and second fittings that allows only slow bleeding of the fuel vapor from the void space to the filler tube, the orifice always being unblocked to enable slow bleeding of the fuel vapor from the void space regardless of the quantity of fuel in the fuel tank.

3. In combination with a welding machine having an internal combustion engine:

a. a tank for holding fuel for the engine that defines a void space when the tank is filled with fuel to thereby prevent overfilling of the tank, the tank comprising:

i. a reservoir comprising:

first and second opposed side walls, first and second opposed end walls, and a bottom wall; and a ton wall with a baffle depending therefrom located between the first and second side walls, the baffle terminating in a lowermost edge; and ii. a filler tube upstanding from the top wall proximate the second side wall such that fuel filled in the filler tube rises in the reservoir to the baffle lowermost edge and further fuel filled in the filler tube creates the void space that is partially bounded by the first side wall and the baffle and by an edge portion of the top wall located between the baffle and the first side wall; and b. a vent system that enables bleeding of fuel vapor only from the void space to the filler tube independent of the amount of fuel in the tank, the vent system comprising a tubing having a first end connected to the portion of the tank top wall located between the baffle and the first side wall, and a second end connected to the filler tube.

4. The combination of claim 3 wherein:

a. the top wall is formed with an uninterrupted concave section between the top wall edge portion and the filler tube, the concave section having a first part joined to the top wall edge portion, and a second part joined to the concave section first part and to the filler tube, the concave section defining a bottom line at a junction between the first and second parts; and b. the baffle coincides with the first part of the concave section.

5. The combination of claim 4 wherein the baffle has a lowermost edge that coincides with the bottom line of the concave section.

6. A method of controlling the level of fuel in a fuel tank comprising the steps of:

a. providing a fuel tank reservoir and a filler tube upstanding from the reservoir and having an open top end;

b. filling a first amount of fuel into the filler tube and raising the fuel to a first level throughout the reservoir;

c. filling a second amount of fuel into the filler tube and raising the fuel to a second level in the filler tube proximate the top end and simultaneously creating a void space in the reservoir that is partially bounded by the fuel at the first level thereof; and d. bleeding fuel vapor from the void space to the filler tube when the fuel is at the second level in the filler tube.

7. The method of claim 6 wherein:

a. the step of creating a void space comprises the steps of:

i. providing a baffle in the fuel tank reservoir between the filler tube and a first wall of the reservoir opposite the baffle from the filler tube; and ii. creating the void space in the reservoir between the baffle and the reservoir first wall; and b. the step of bleeding fuel vapor from the void space comprises the steps of:

i. providing a single tube with first and second ends;

ii. connecting the tube first end to the void space and connecting the tube second end to the filler tube; and iii. exerting hydrostatic pressure on the fuel vapor in the void space by the fuel in the fuel tank and thereby expelling the fuel vapor from the void space solely through the tube to the filler tube.

8. The method of claim 7 comprising the further step of providing a predetermined restriction to the bleeding of the fuel vapor from the void space to the filler tube an amount that is simultaneously sufficient to enable the fuel vapor to bleed from the void space to the filler tube and to enable raising the fuel to the second level in the filler tube.

9. In a fuel tank of the type having a reservoir having a top wall and first and second opposed side walls; and a filler tube having a lower end that enters into the reservoir top wall proximate the reservoir first side wall, the filler tube upstanding from the reservoir and terminating in a top end, the fuel tank being partially fillable with liquid fuel such that tilting the fuel tank such that the filler tube lower end is at a lower elevation than the reservoir second wall and the fuel covers the filler tube lower end in a manner that creates a void space adjacent the reservoir second side wall and traps fuel vapors in the void space, a vent system comprising means for venting the reservoir only from a location adjacent the reservoir second side wall to the filler tube top end to thereby prevent the fuel vapor from exerting a pressure in the void space that forces the fuel up the filler tube, wherein the means for venting comprises:

a. a single fitting in the reservoir top wall adjacent the second side wall;

b. a single fitting in the filler tube proximate the top end thereof; and c. a vent tube having first and second ends that are connected to the fittings in the top wall and the filler tube, respectively, so that the fuel tank is free of any passage between the filler tube and the reservoir except for the vent tube and the first and second fittings.

10. The fuel tank of claim 9 further comprising an orifice in a selected one of the fittings to restrict the venting of the fuel vapor from the void space, the orifice being always open to enable venting of the fuel vapor through the vent tube regardless of the quantity of fuel in the fuel tank.

* * * * *